United States Patent [19]

Kirgios et al.

[11] Patent Number: 5,326,441
[45] Date of Patent: Jul. 5, 1994

[54] PROCESS FOR SEPARATING AND CONCENTRATING GALLIUM FROM AN AQUEOUS SOLUTION CONTAINING GALLIUM, TOGETHER WITH ALUMINUM, ZINC AND COPPER

[75] Inventors: Ioannis Kirgios, Wesseling; Karl Schügerl, Hemmingen; Wolfgang Degener, Bielefeld, all of Fed. Rep. of Germany

[73] Assignee: European Economic Community, Plateau du Kirchberg, Luxembourg

[21] Appl. No.: 890,602
[22] PCT Filed: Jan. 19, 1990
[86] PCT No.: PCT/EP90/02321
§ 371 Date: Jul. 13, 1992
§ 102(e) Date: Jul. 13, 1992
[87] PCT Pub. No.: WO91/10621
PCT Pub. Date: Jul. 25, 1991

[30] Foreign Application Priority Data

Jan. 19, 1990 [LU] Luxembourg ............ 87662

[51] Int. Cl.⁵ .................. B01D 17/06; B03C 5/00; C02F 1/48
[52] U.S. Cl. ....................... 204/186; 204/188
[58] Field of Search ........... 204/186, 188; 210/643, 210/748

[56] References Cited

U.S. PATENT DOCUMENTS 4,360,448 11/1982 Li et al. .................. 252/309
4,775,479 10/1988 Schügerl et al. ........... 210/643

FOREIGN PATENT DOCUMENTS 63-89635A 4/1988 Japan ............ C22B 58/00
991614 5/1965 United Kingdom .

OTHER PUBLICATIONS

Comptes Rendus de L'Academie des Sciences Paris, part 292, Apr. 6, 1987, series II, D. Bauer et a.: "Chimie Analytique–Existence d'une microemulsion dans les systemes d'extraction du gallium par la beta–dodeceny-l-7 hydroxy-8 quinoleine dite Kelex 100", pp. 1019–1022.
Chemical Abstracts, vol. 106, 1987 (Columbus, Ohio, US), se p. 224, abstract No. 217452r, Gongkai Shuomingshu) Jul. 30, 1987.

*Primary Examiner*—John Niebling
*Assistant Examiner*—Brendan Mee
*Attorney, Agent, or Firm*—Sughrue, Mion, Zinn, Macpeak & Seas

[57] ABSTRACT

Process for separating and concentrating gallium from an aqueous solution containing gallium, together with aluminium, zinc and/or copper, charactrized by the following combination of features: (a) preparation of a water-in-oil emulsion consisting of a neutral or alkaline aqueous phase and an organic phase containing an oil-soluble reactant in a homogenizer in a volume ratio of aqueous phase to organic phase of 2:2 to 3:2; (b) dispersion of the water-in-oil emulsion in the aqueous solution containing gallium, which is adjusted to at least 4 mol/l of HCI, in an extractor in a volume ratio of aqueous phase to water-in-oil emulsion of 30:1 to 10:1 until droplets of the water-in-oil emulsion with a diameter less than or equal to 1 mm are obtained; (c) separation of the water-in-oil emulsion from the aqueous continuum and splitting of the emulsion in a reactor with coaxial, double-insulated electrodes in a high-voltage kV/cm and a frequency greater than 50 Hz, the unsplit portion of the water-in-oil emulsion being recycled into step (b); (d) separation of the electrocoalesced organic phase of the water-in-oil emulsion in a gravity separator and recycling of the same into step (a).

13 Claims, 8 Drawing Sheets

☐ Kerosin
☐ Emulgator
■ Carrier

PROCESS FOR SEPARATING AND CONCENTRATING GALLIUM FROM AN AQUEOUS SOLUTION CONTAINING GALLIUM, TOGETHER WITH ALUMINUM, ZINC AND COPPER

FIELD OF THE INVENTION

The invention relates to a process for the separation and concentration of gallium from aqueous solutions that contain gallium together with aluminium, zinc and/or copper by means of reaction extraction using liquid membrane emulsions, which process permits the production of concentrated gallium solutions of a high degree of purity that contain more than 10 g/l of gallium in the form of gallium halide from initial gallium-containing solutions containing no more than 5 g/l of gallium.

BACKGROUND OF THE INVENTION

High-purity gallium and gallium compounds find increasing use, mainly in the electronics industry. Doped gallium arsenide, gallium phosphide and gallium arsenide phosphite have proved especially suitable as semi-conductor materials. In addition, gallium arsenide can be used in the construction of lasers and solar cells. Another possible use is in the field of superconductors based on gallium, which is currently in the development stage.

In the minerals available, gallium is present only in very low concentrations of from 0.001% (bauxite) to a maximum of 1.8% (germanite). It is generally in association with zinc, aluminium and/or copper. The low concentrations of the ore make particular demands on any process for recovering gallium as regards selectivity of the material separation and the possibility of concentration.

Gallium is obtained when working up bauxite and also zinc- and germanium-containing ores (cf. "Ullmanns Encyklopädie der Technischen Chemie", volume 11 (1986), p. 753). The separation and concentration of gallium is generally carried out in the so-called Pechiney, Alcoa or Reynolds process (cf. US-PS 3 890 427). All these processes are based on the separation of the aluminium by precipitation. From the solutions that remain, the gallium and residues of aluminium are precipitated in the form of hydroxides by means of carbon dioxide. The aluminium- and gallium-containing hydroxide is dissolved in sodium hydroxide solution and subjected to electrolysis. Further, a solution having a low concentration of gallium is obtained as a circulating solution of the Bayer process.

The hydrometallurgical separation of gallium has hitherto been carried out by liquid-liquid extraction from hydrochloric acid solutions (cf. M.L. Good, F.F. Holland, "J. Inorg. Nucl. Chem.", 26 (1964), page, 321, and T. Sato, T. Nakamura, S. Ishikawa, "Solv. Extr. I. Exch."2 (1984), page 2019). The use of tributyl phosphate, triaryl-phosphine, trioctyl phosphine oxide, crown ethers or dihexyl sulphide for the extraction of gallium is also already known (cf. V.P. Judin, R.G. Bautista, "Metall. Trans. B. ", 17B (2), 1986, page 259; A.M. Reznik, L.A. Zekel, "Zh Neorg. Khim." 24 (4), 1979, page 1025; Y. Amashji, T. Matsushita, M. Wada, T. Shono, "Chem. Lett." 1 (1988), page 43; Y. Hasegawa, T. Shimada, M. Niitsu, "J. Inorg. Nucl. Chem." 42 (10), 1980, page 1487; H. Koshima, H. Onishi, "Analyst (London)" 111 (11) (1986), 1261; and Y. Baba, H. Nakamura, K. Inoue, "J. Chem. Eng. Jpn." 19 (6), 1986, page 497).

The yields of high-purity gallium that can be obtained by these processes are, however, inadequate, and in particular the complete removal of aluminium, zinc or copper is insufficient if these are in a high excess compared with gallium.

The problem underlying the invention was therefore to find a process rendering possible the separation and concentration, in an even more effective manner, of gallium from aqueous solutions containing gallium together with aluminium, zinc and/or copper.

It has now been found that this problem can be solved in accordance with the invention by separating and concentrating the gallium in a multiple emulsion system using secondary amines as selective transporting reactants. That is to say, when the hydroxides (for example from working up bauxite according to Pechiney) or ores containing aluminium and gallium in addition to other heavy metals are leached with hydrochloric acid solution, it is possible to separate and concentrate gallium by reaction extraction using liquid membrane emulsions. By this means concentrated gallium solutions of a high degree of purity are obtained.

Summary of the Invention

This process comprises a combination of the following measures:

a) gallium-containing solutions are acidified with hydorchloric acid or gallium-containing residues are dissolved in hydrochloric acid, b) extraction is carried out from solutions containing at least 4 and preferably from 4 to 6 mol/l of hydrochloric acid, c) for the extraction, a water-in-oil emulsion (w/o emulsion) containing a secondary amine and an acid-resistant oligomeric and non-ionic surfactant with an HLB>3 and a molar mass>400 g/mol, preferably polyisobutylene/polysuccinic acid anhydride/-polyamine, is dispersed in the gallium-containing solution in an extractor, the ratio by volume of gallium-containing hydrochloric acid solution to w/o emulsion being from 30:1 to 10:1.

d) the w/o emulsion is produced in a homogenizer, in a ratio by volume of from 2:3 to 3:2, from a predominantly aliphatic solvent having a high flashpoint, preferably kerosene, with the dissolved secondary amine and polyamine and water having a hydrogen ion concentration $\leq 0.01$ mol/l, e) the w/o emulsion is separated from the solution, from which the gallium has been removed, and is broken in an electrical alternating field of 0.5–8 kV/cm field strength and a frequency >50 Hz between two doubly insulated coaxial electrodes, and f) the freed, gallium-rich aqueous phase is removed and the regenerated organic phase is emulsified again with uncharged or partially charged water with a hydrogen ion concentration <0.01 mol/l.

The invention relates to a process for the separation and concentration of gallium from an aqueous solution that contains gallium together with aluminium, zinc and/or copper which is characterised by the combination of the following features:

a) Preparation in a homogenizer of a water-in-oil emulsion (w/o emulsion) from a neutral or alkaline aqueous phase and an organic phase that contains an oil-soluble reactant, in a ratio by volume of aqueous phase to organic phase of from 2:3 to 3:2, b) Dispersion of the w/o emulsion in the gallium-containing aqueous solution, which has been adjusted to at least 4 mol/l of HCl, in an extractor in a ratio by volume of aqueous solution to w/o emulsion of from 30:1 to 10:1 until w/o emulsion droplets having a diameter of $\leq 1$ mm are obtained, c) Removal of the w/o emulsion from the aqueous continuum and breakage of the emulsion in a reactor with coaxial, doubly insulated electrodes in an applied high voltage alternating field having a field strength of at least 0.5 kV/cm and a frequency of more than 50 Hz, the unbroken portion of the w/o emulsion being returned to step (b), d) Removal of the electrocoalesced organic phase of the w/o emulsion in a gravitational separator and return thereof to step (a).

Detailed Description of the Invention

Further processing of the electrocoalesced gallium-containing stripped-off aqueous phase of the w/o emulsion is carried out as desired by solvent extraction, re-extraction with water or a sodium hydroxide solution, and electrolysis of the resulting aqueous solution to recover gallium, and also, where appropriate, zone melting for the purpose of further purification.

The leaching solutions of the Bayer process are ideal solutions for hydrometallurgical recovery of gallium in accordance witht he present invention. It is however, also possible to process hydrochloric acid leaching solutions of gallium-containing ore in accordance with the invention. By using a special liquid membrane emulsion according to the invention, gallium can also be separated with good selectivity where there are high excesses of aluminium, zinc and/or copper, and purified by subsequent electorlysis and zone melting.

The use in accordance with the invention of a specially composed w/o emulsion as the disperse phase of a process analogous to extraction renders possible a sumultaneous extraction and concentration of gallium in the form of an anionic halide complex (cf. Examples 1 and 3 hereinafter). The gallium can be completely separated from aluminium. Gallium is preferentially transported even when there is a forty-fold excess of zinc or copper (cf. Examples 3, 4 and 5 hereinafter).

Typical starting solutions have a gallium content of from 100 to 300 ppm and a zinc content of from 5 to 6 g/l in addition to other elements. In the last step of the process of the invention, a solution containing more than 10 g/l of gallium in the form of gallium halide is obtained. The organic reactants and solvents employed in the process of the invention can be recovered in a high yield and recirculated in the process.

Preferred developments of the process of the invention are given in the sub-claims.

The invention is explained in detail hereinafter with reference to the accompanying drawings but without any limitation thereto.

The following abbreviations and definitions are used in the description of the invention and in the accompanying drawings:

bd portion of the aqueous phase split off
bsm mean breakage rate of the emulsion in ml/min
$c_i$ concentration in mg/kg
$F_V$ volumetric flow in ml/min
$V_R$ volume in ml $$\text{residual portion } F = \frac{\text{raffinate concentration}}{\text{initial concentration}}$$

$$\text{Enrichment: } \frac{\text{concentration in the starting solution}}{\text{concentration in the emulsion}}$$

$$\text{Selectivity } S = \frac{(c_{Ga,0} - c_{Ga,t})}{(c_{Zn,0} - c_{Zn,t}) + (c_{Cu,0} - c_{Cu,t}) + (c_{Ga,0} - c_{Ga,t})}$$

The chemicals used in accordance with the invention are as follows:

Kerosene: Exsol D80, Esso AG, boiling range 180°-240° C., aromatic content 1%

Paranox 100: polyisobutylene/succinic acid anhydride/-polyamine, Exxon, specification: technical-grade, M 731 g/mol, HLB>4

Paranox 107: polyisobutylene/succinic acid anhydride/-polyborane/ polyamine, Exxon, specification: technical-grade, M 834 g/mol, HLB>4

Amberlite LA-2: N-lauryl-N-trialkylaminemethylamine, Rohm & Haas, specification: technical-grade, M 351-393 g/mol Span 80: sorbitan monooleate, Serva, specification: technical-grade, M 428 g/mol, HLB~4.3

Acorga P 5100: 5-nonyl-salicylaldoxine, Acorga Corp. Ltd., specification: technical-grade, M unknown.

Figure 1:
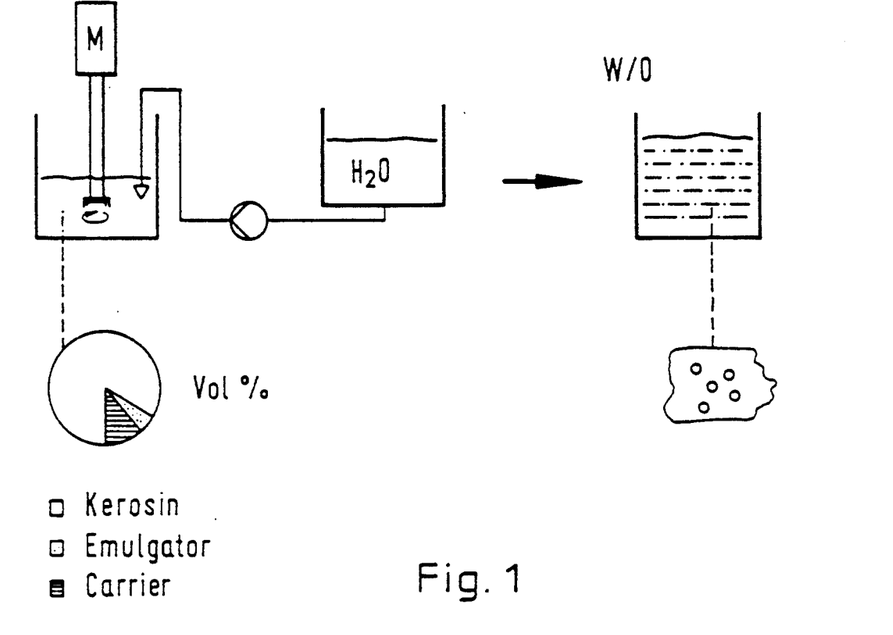
FIG. 1 is a schematic representation of the prepartion of the w/o emulsion used in accordance with the invention in step (a) of the process of the invention.

When carrying out the process according to the invention in practice, in a first process step, which is shown in FIG. 1, a w/o emulsion is prepared from an organic phase which is doped with a secondary amine (for example Amberlite LA-2) and with a non-ionic surfactant (for example Paranox 100 or Paranox 107) and a neutral or alkaline aqueous phase.

The emulsification 1 is followed (see FIG. 2) by an extractor 2 in which the emulsion is dispersed in a gallium-containing solution that has previously been adjusted to an acid content of at least 4 mol/l of HCl, preferably from 4 to 6 mol/l of HCl. The emulsion is so dispersed that emulsion droplets having a maximum diameter of 1 mm are obtained.

Figure 2:
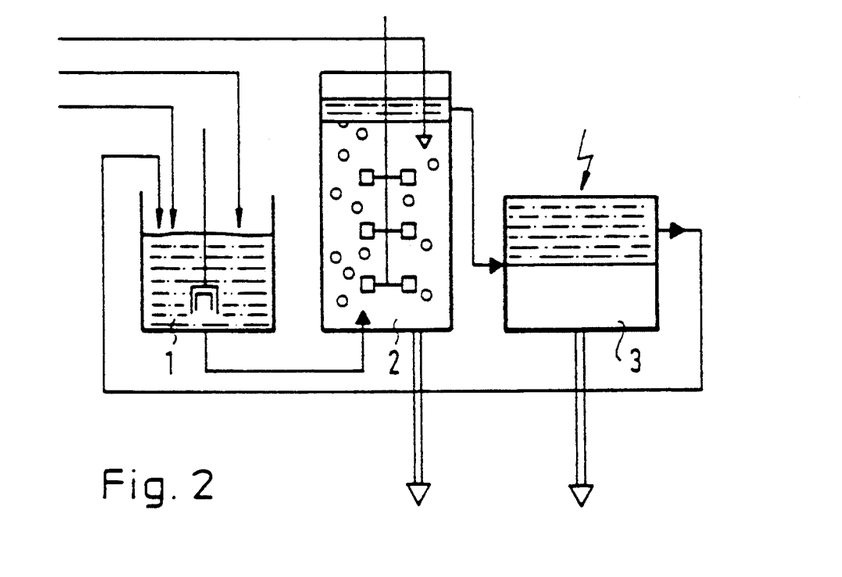
FIG. 2 is a schematic representation of the course of the extraction process according to the invention.

After a maximum residence time of 4 minutes in the extractor, the w/o emulsion is separated from the aqueous continuum and fed to the emulsion breakage 3.

Figure 3A:
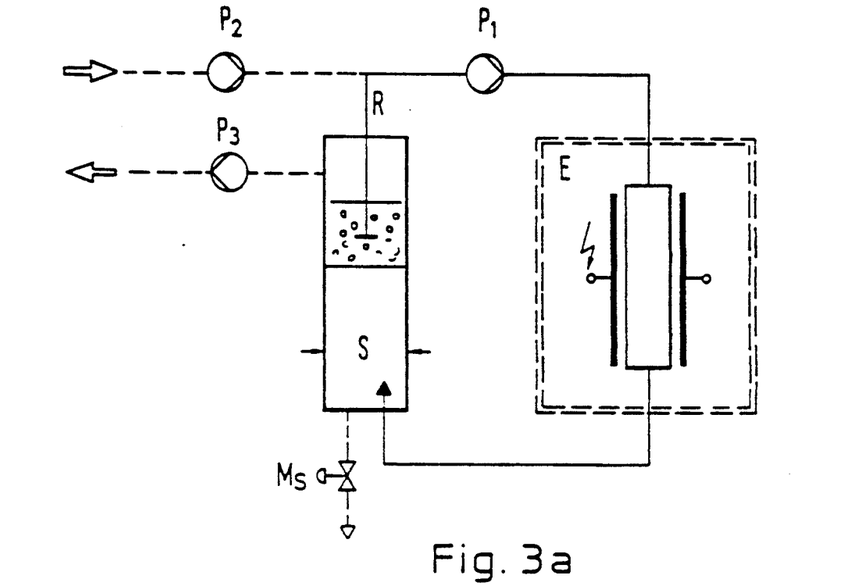
FIGS. 3a, 3b and 3c are, respectively, a schematic representation of an electrocoalescence plant that can be used for carrying out step (c) of the process according to the invention, a representation of the various reactors that can be used, and a schematic representation of an emulsion breaker that can be used in accordance with the invention with an additional loop for returning separated aqueous phase.
Figure 3B:
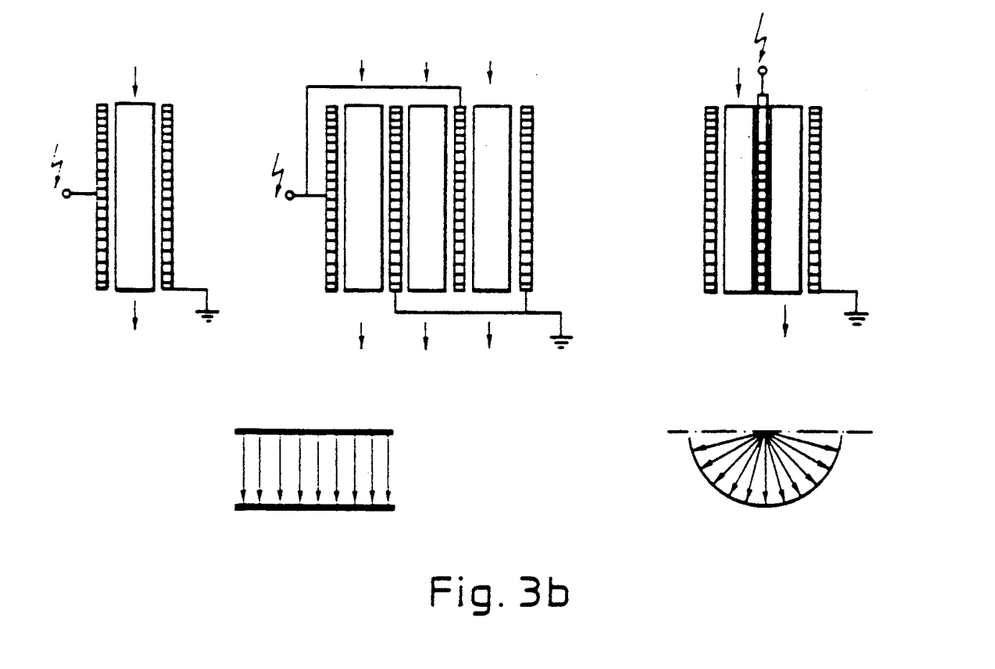
Figure 3C:
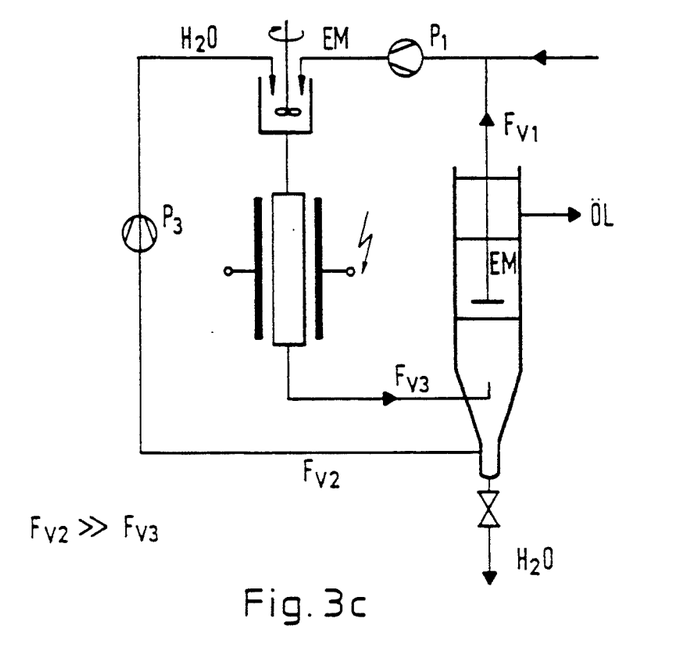

The emulsion breakage is induced electrostatically and is carried out with alternating voltage fields having a field strength of at least 0.5 kV/cm and a frequency >50 Hz, preferably ≧1 kHz, in a reactor with coaxial, doubly insulated electrodes. The reactor is rupture-resistant and has a return for unbroken emulsion and, optionally, a return for a portion of the coalesced aqueous phase for the purpose of accelerating coalescence (cf. FIG. 3). The volumetric flows of the fresh emulsion, of the return of the unbroken emulsion and of the coalesced aqueous phase are from 1:1:0.01 to 1:10:0.5.

After breakage of the w/o emulsion, the concentrated gallium-containing stripped-off phase of the emulsion can be further processed.

The organic phase of the emulsion is returned to the emulsion preparation step and emulsified again (cf. Example 7 hereinafter).

The selectivity of the extraction can be very substantially increased by a two-step process. The residence time of the emulsion in the extractor is increased until the stripped-off phase likewise contains 4 mol/l of HCl, that state being achieved after 8 minutes.

Solvent extraction from the gallium-containing stripped-off solution obtained by electrocoalescence can then be carried out with an organic phase containing one of the abovementioned carriers. Water or an aqueous sodium hydroxide solution is used for the re-extraction. The selectivity of the extraction thereby reaches a value of 0.95 (cf. Example 6 hereinafter).

The invention is explained in detail in the following Examples without, however, being limited thereto.

EXAMPLES

In all of the Examples the leaching solutions used contained 160 ppm of gallium (Ga) and 6 mol/l of HCl unless stated otherwise. A phase volumetric ratio of gallium-containing leaching solution to w/o emulsion of 20:1 was set. The extraction was carried out in a discontinuously agitated vessel with a flow interrupter and turbine stirrer. The phases were thoroughly mixed at 250 revs/min of the stirrer.

In all cases, unless specified otherwise, the residual portion F according to the above definition of the extractable metals is represented as a function of the contact time of the phases.

The preparation of the w/o emulsion used in accordance with the invention is carried out in accordance with FIG. 1 in which:
M = Homogenizer (rotor/stator or static homogenizer, as desired)
OP = organic phase
WP = aqueous phase
d = diameter of the emulsified organic liquid droplets.

The course of the process according to the invention is illustrated schematically in FIG. 2.

FIG. 3a is a schematic representation of an electrocoalescence plant that can be used in accordance with the invention in which E = emulsion breaker V = 300 cm$^3$, F$_{Vmax}$ = 300 ml/min
S = gravitational separator V = 1800 cm$^3$, average area A = 0.035 m$^2$
R = emulsion return
P$_1$ = emulsion feed pump
P$_2$ = emulsion circulating pump
P$_3$ = feed pump for coalesced organic phase
M$_X$ = outlet valve for coalesced aqueous phase The insulation of the emulsion breaker consisted of castor oil and glass (as desired PVDF = polyvinylidene fluoride).

FIG. 3b shows reactors that can be used in the process according to the invention for carrying out emulsion breakage, there preferably being selected according to the invention a reactor with a coaxial electrode arrangement (right-hand diagram).

FIG. 3c shows an emulsion breaker that can be used in accordance with the invention with an additional loop for the return of separated aqueous phase, in which
EM = emulsion (w/o)
F$_{V1}$ = volumetric flow, fresh emulsion
F$_{V2}$ = volumetric flow, prebroken emulsion
F$_{V3}$ = volumetric flow, coalesced disperse (aqueous) phase

Example 1

Effect of the carrier concentration on gallium extraction

Figure 4:
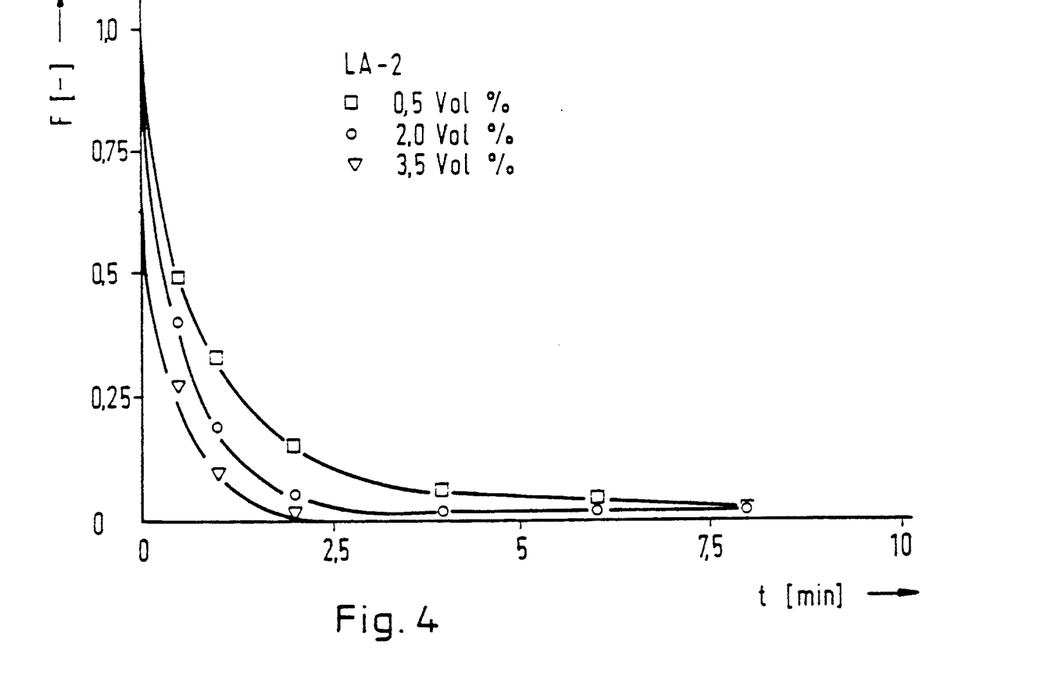
FIG. 4 shows the gallium extraction in the multiple emulsion system according to the invention with varying carrier concentration.

The w/o emulsion used consisted of 0.9% by volume of Paranox 100 and Amberlite LA-2 in the concentration indicated in FIG. 4, with the remainder consisting of kerosene as organic phase and water as continuous phase.

The results obtained after carrying out these experiments are illustrated in graphic form in FIG. 4.

Example 2

Extraction from solutions with reduced acid content

The required chloride concentration was established by adding ammonium chloride. The pH value of the solution was adjusted to 0. The residual portion of gallium can also be markedly reduced by extraction.

The w/o emulsion used consisted of 0.9% by volume of Paranox 100, 2% by volume of Amberlite LA-2, with the remainder consisting of kerosene as organic phase and water as continuous phase.

Figure 5:
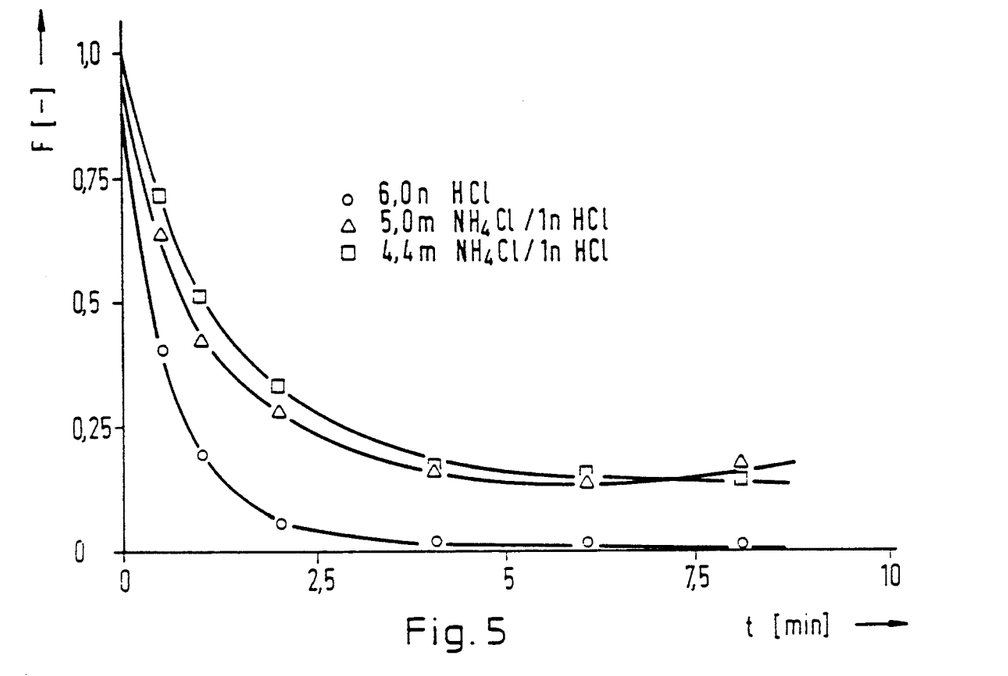
FIG. 5 shows the gallium extraction according to the invention with varying acid concentration.

The results obtained after carrying out these experiments are illustrated in graphic form in FIG. 5.

Example 3

Gallium extraction from copper-containing solution

The gallium-containing solution used contained in addition 100 or 6000 ppm of copper, respectively. The concentration of the metals after 8 minutes' extraction was determined as follows after breakage of the w/o emulsion:

| | | | | | |
|---|---|---|---|---|---|
| $c_{O,Cu}$ = | 100 ppm | $c_{Ga}$ = | 6000 ppm | enrichment: | 37.5 |
| | | $c_{Cu}$ = | 222 ppm | enrichment: | 2.2 |
| $c_{O,Cu}$ = | 6000 ppm | $c_{Ga}$ = | 6000 ppm | enrichment: | 37.5 |
| | | $c_{Cu}$ = | 7000 ppm | enrichment: | 1.2 |

The w/o emulsion used consisted of 0.9% by volume of Paranox 100, 2% by volume of Amberlite LA-2, with the remainder consisting of kerosene as organic phase and water as continuous phase.

Figure 6:
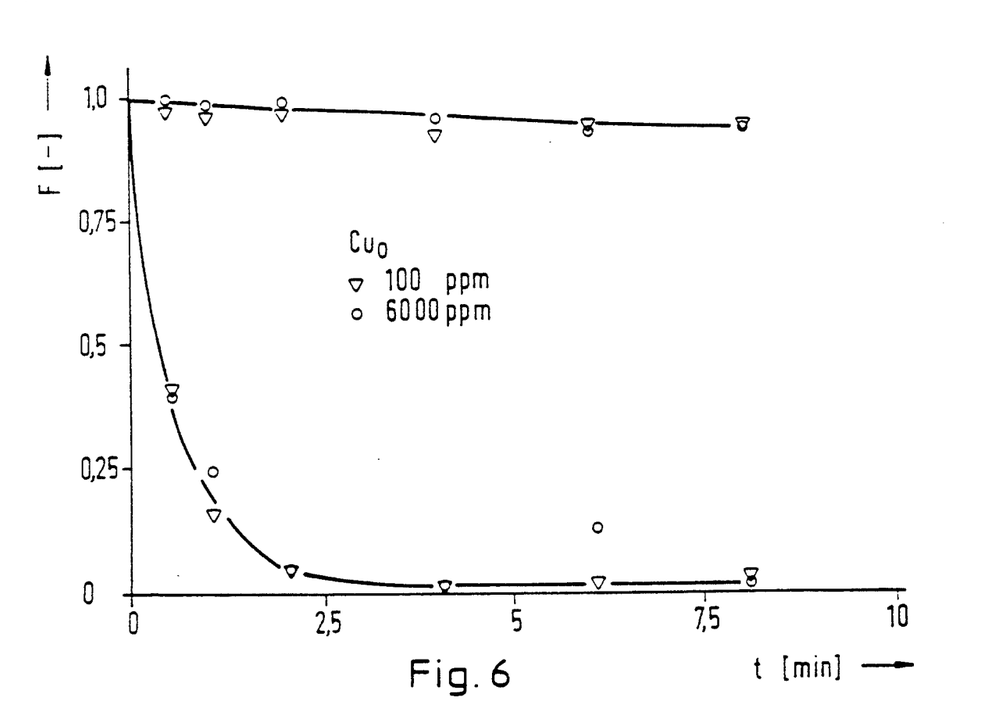
FIG. 6 shows the gallium extraction according to the invention from a copper-containing solution.

The results obtained after carrying out these experiments are illustrated in graphic form in FIG. 6.

Example 4

Gallium extraction from zinc-containing solution

The gallium-containing solution used contained in addition 6000 ppm of zinc. The concentration of the metals after 8 minutes' extraction was determined as follows after breakage of the w/o emulsion:

| $c_{O,Zn}$ = | 6000 ppm | $c_{Ga}$ = | 6100 ppm | enrichment: | 37.5 |
|---|---|---|---|---|---|
| | | $c_{Cu}$ = | 2700 ppm | enrichment: | 0.45 |

The w/o emulsion used consisted of 0.9% by volume of Paranox 100, 2% by volume of Amberlite LA-2, with the remainder consisting of kerosene as organic phase and water as continuous phase.

Figure 7:
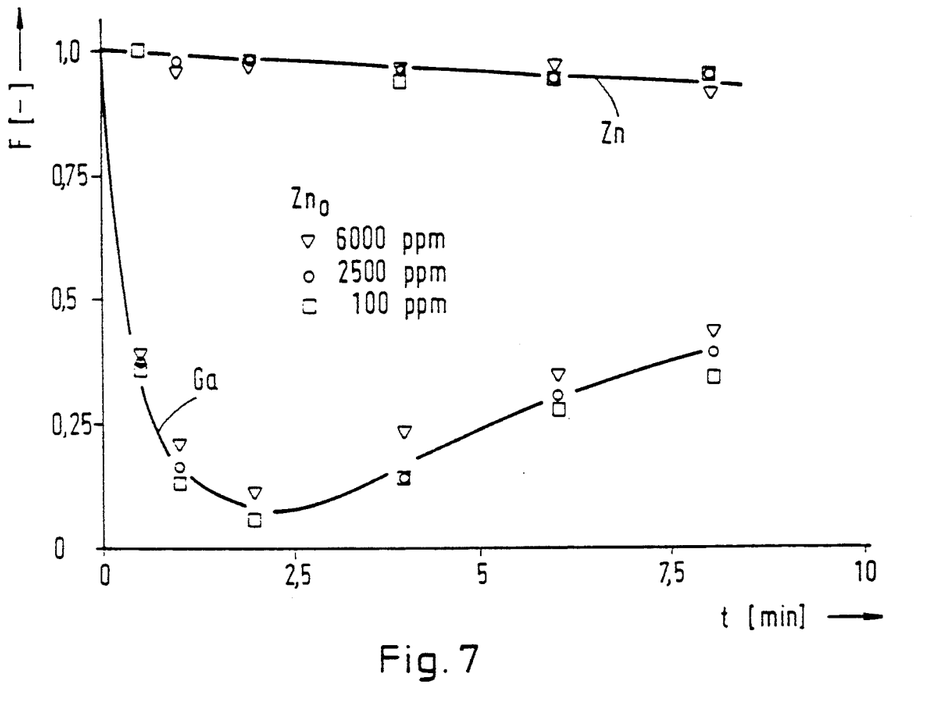
FIG. 7 shows the gallium extraction according to the invention from a zinc-containing solution.

The results obtained after carrying out these experiments are illustrated in graphic form in FIG. 7.

Example 5

Selectivity of the gallium extraction in the presence of an excess of zinc and copper Since the selectivity of the transport decreases as extraction time is increased, taking into consideration Example 1 a maximum contact time of between 2.5 and 4 minutes in the countercurrent extractor was selected.

Figure 8A:
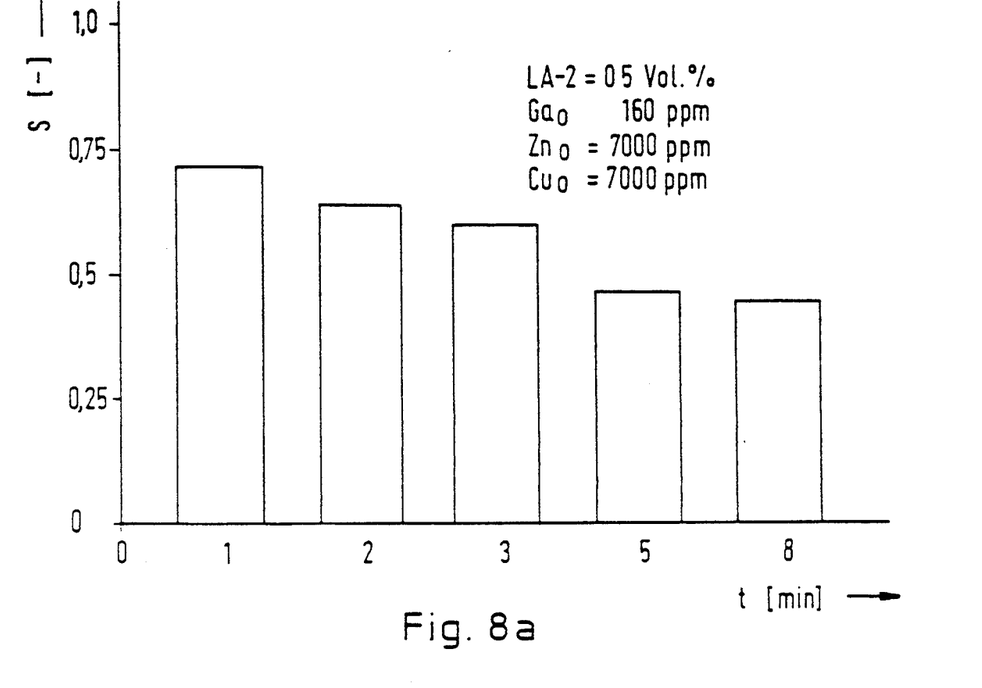
FIGS. 8a and 8b show the selectivity and the separation factor of the gallium extraction according to the present invention.
Figure 8B:
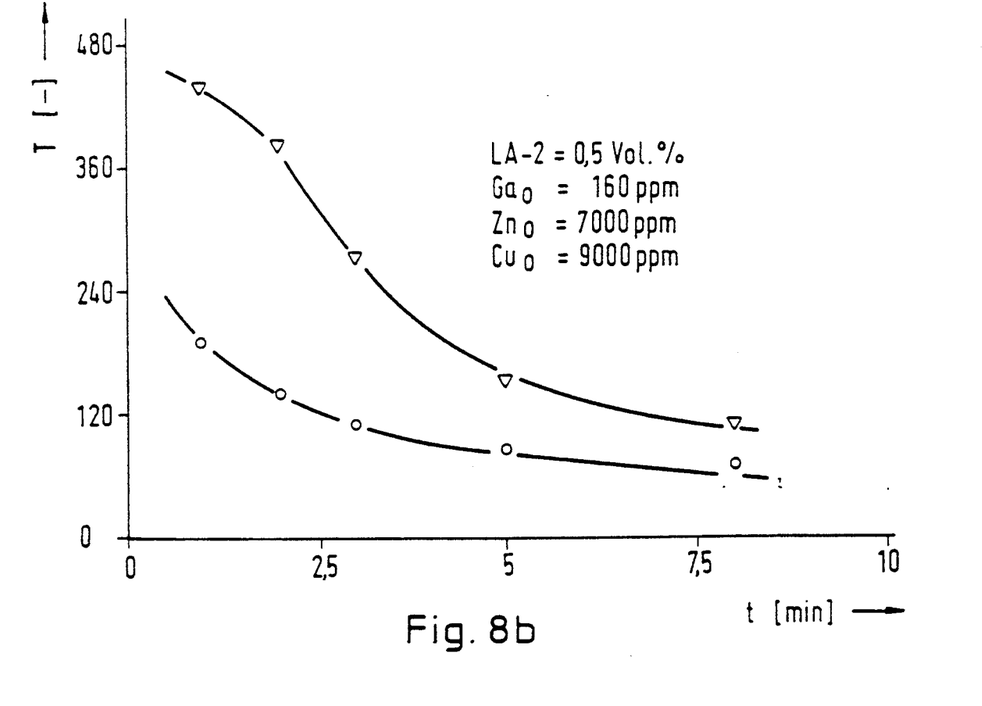

The results obtained after carrying out these experiments are illustrated in FIGS 8a and 8b, the former showing the selectivity as a function of time and the later the separation factor as a function of time. The upper curve in FIG. 8b relates to copper and the lower to zinc.

Example 6

Selectivity of the gallium extraction from the freed stripped-off phase of the w/o emulsion Gallium was extracted with selectivities >95% from a stripped-off solution enriched with gallium.

The initial concentrations of zinc and copper were in each case 120 ppm.

Figure 9:
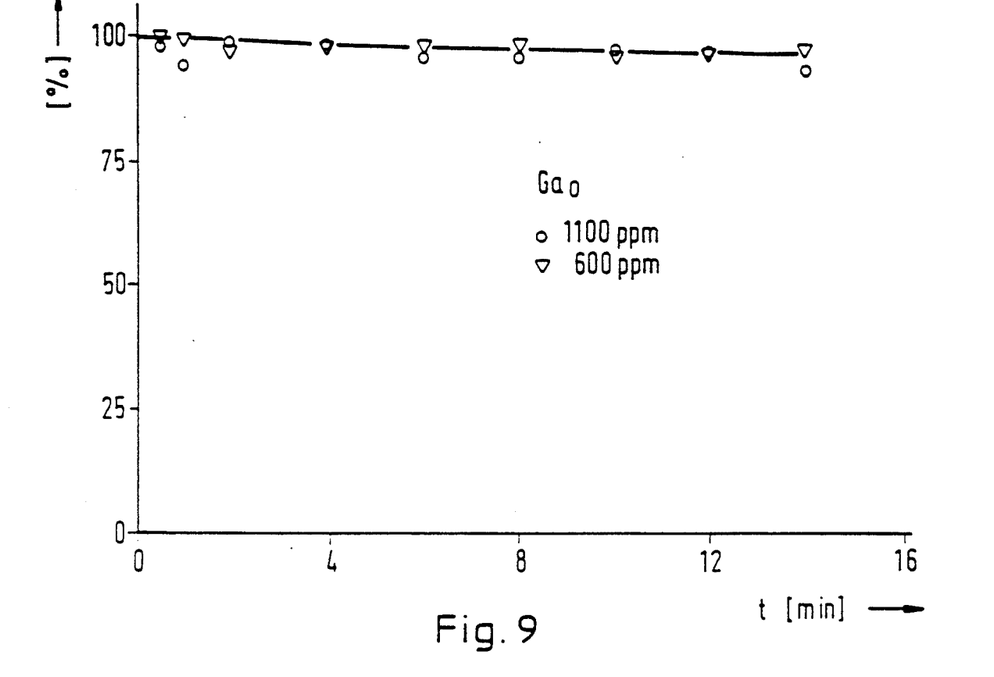
FIG. 9 shows the selectivity of the gallium extraction from the stripped-off solution.

The results obtained after carrying out these experiments are illustrated in graphic form in FIG. 9, the selectivity being plotted against time.

Example 7

Regeneration of the organic phase of the w/o emulsion by electrocoalescence

Reactor used: $V_r$=300 ml, coaxial electrodes made of aluminium

Insulation: castor oil, glass, thickness of insulation <3 mm

Figure 10:
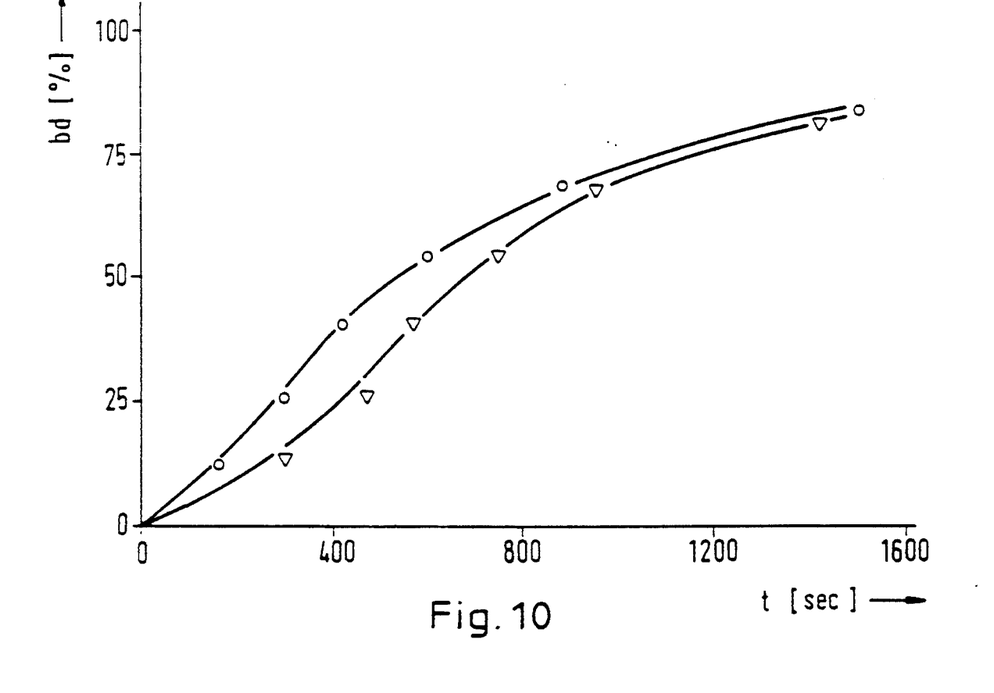
FIG. 10 shows the course of the continuous emulsion breakage without return of the coalesced aqueous phase.
Figure 11:
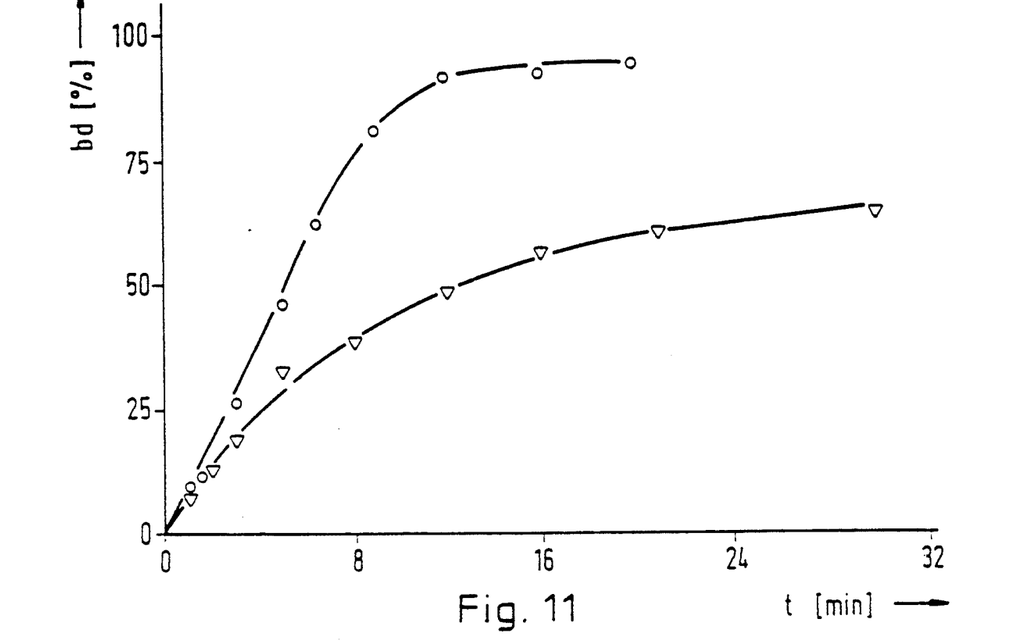
FIG. 11 shows the course of a discontinuous emulsion breakage.
Figure 12:
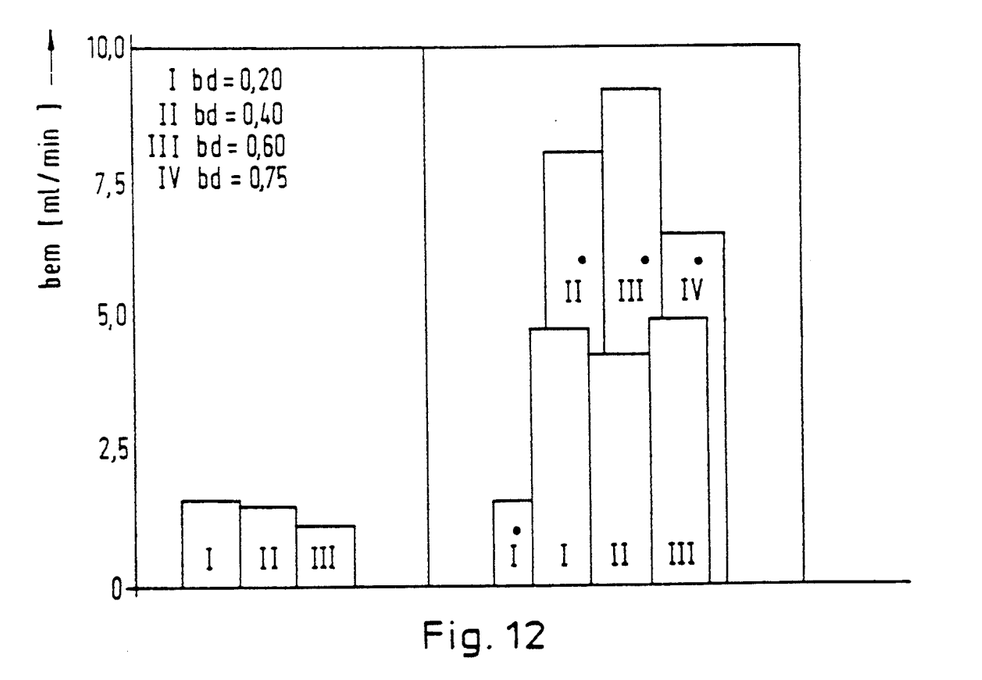
FIG. 12 shows the course of a continuous emulsion breakage with and without return of the coalesced aqueous phase.

W/o emulsion used: 0.9% by volume Paranox 100, 2% by volume Amberlite LA-2, the remainder being kerosene as organic phase in water as continuous phase Parameter: $F_V$=130 ml/min (emulsion), 1 kV/cm, 1 kHz The results obtained after carrying out these experiments are shown in FIGS. 10, 11 and 12. FIG. 10 shows two curves for the continuous emulsion breakage without return of the coalesced aqueous phase, that is one without metal in the stripping phase (lower curve) and one with 6 g/l of metal (upper curve). The discontinuous emulsion breakage according to FIG. 11 was carried out at E=8 kV/cm and f=50 Hz and a concentration of Amberlite LA-2 of 2% by volume (the lower curve is a comparison curve without LA-2), whilst the continuous emulsion breakage with and without return of the coalesced aqueous phase according to FIG. 12 was carried out at 2 kV/1 kHz and $F_V$=50 ml/min using a w/o emulsion with 1.75% by vol. Span 80, 5% by vol Ac P 5100, with the remainder being kerosene as organic phase and 40% 2N HCl as continuous phase. The left-hand part of FIG. 12 shows the ratios without return and the right-hand part the ratios with return. The regions indicated by asterisks relate to the case of a modified field.

I claim:

1. A process for separating and concentrating gallium from an aqueous solution containing gallium together with aluminum, zinc and/or copper, comprising the steps of:
    a) preparing a water-in-oil emulsion in a homogenizer, the emulsion being prepared from a neutral or alkaline aqueous phase and an organic phase, the organic phase containing an oil-soluble reactant, the oil-soluble reactant comprising a secondary amine and a non-ionic surfactant, the emulsion having a ratio by volume of aqueous phase to organic phase of from 2:3 to 3:2;
    b) dispersing the emulsion in the aqueous solution in an extractor in a ratio by volume of aqueous solution to emulsion of from 30:1 to 10:1 until emulsion droplets having a diameter up to 1 mm are obtained, the aqueous solution containing at least 4 mol/l of HCl;
    c) removing the emulsion from the aqueous solution and breaking the emulsion in a reactor using an applied high voltage alternating field having a field strength of at least 0.5 kV/cm and a frequency of more than 50 Hz to form an electrocoalesced organic phase and an electrocoalesced gallium-containing stripped-off aqueous phase, the reactor having coaxial, double insulated electrodes, and returning an unbroken portion of the emulsion to the extractor;
    d) removing the electrocoalesced organic phase in a gravitational separator and returning the electrocoalesced organic phase to the homogenizer.

2. A process according to claim 1, further comprising the step of subjecting the electrocoalesced gallium-containing stripped-off aqueous phase to solvent extraction, re-extraction with water or a sodium hydroxide solution and electrolysis to recover gallium.

3. A process according to claim 1, wherein the oil-soluble reactant comprises from 5 to 100 mmol/l of N-lauryl-N-trialkylmethylamine and an acid-resistant oligomeric and non-ionic surfactant having an hydrophile lipophile balance greater than 3 and a molar mass greater than 400 g/mol.

4. A process according to claim 1, wherein the aqueous phase of the emulsion has a hydrogen ion concentration of up to $10^{-2}$ mol/l.

5. A process according to claim 1, wherein the emulsion has a residence time in the extractor whereby the internal phase of the emulsion contains at least 4 mol/l of HCl.

6. A process according to claim 5, further comprising the step of subjecting the electrocoalesced gallium-containing stripped-off aqueous phase after emulsion breakage to solvent extraction using as an extraction agent at least 100 mmol/l of N-lauryl-N-trialkylmethylamine in a predominantly aliphatic solvent having a high flashpoint to form a raffinate, and returning the raffinate to the homogenizer.

7. A process according to claim 1, further comprising the step of adding from 0.1 to 1 mol/l of HCl and from 3 to 4 mol/l of alkali chloride or alkaline earth chlroide to the aqueous solution before carrying out step (b).

8. A process according to claim 1, further comprising the step of returning a portion of the electrocoalesced gallium-containing stripped-off aqueous phase to the reactor and dispersing the portion of the electrocoalesced gallium-containing stripped-off aqueous phase in the emulsion using a low energy input.

9. A process according to claim 1, wherein the organic phase of the emulsion contains a solvent comprising kerosene.

10. A process according to claim 2, further comprising the step of zone melting the electrocoalesced gallium-containing stripped-off aqueous phase for further purification.

11. A process according to claim 3, wherein the acid-resistant oligomeric and non-ionic surfactant is polyisobutylene/ polysuccinic acid anhydride/polyamine.

12. A process according to claim 4, wherein the aqueous phase of the emulsion has a hydrogen ion concentration up to $10^{-6}$ mol/l.

13. A process according to claim 6, wherein the predominantly aliphatic solvent having a high flash point is kerosene.

* * * * *